United States Patent
Wiacek et al.

(10) Patent No.: US 11,210,573 B2
(45) Date of Patent: Dec. 28, 2021

(54) VOLUMETRIC DESCRIPTORS

(71) Applicant: Nant Holdings IP, LLC, Culver City, CA (US)

(72) Inventors: John Wiacek, Los Angeles, CA (US); Nicholas J. Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 253 days.

(21) Appl. No.: 16/359,838

(22) Filed: Mar. 20, 2019

(65) Prior Publication Data
US 2019/0294918 A1 Sep. 26, 2019

Related U.S. Application Data

(60) Provisional application No. 62/645,676, filed on Mar. 20, 2018.

(51) Int. Cl.
*G06K 9/62* (2006.01)
*G06K 9/00* (2006.01)
*G06K 9/20* (2006.01)
*G06K 9/46* (2006.01)

(52) U.S. Cl.
CPC ........ *G06K 9/629* (2013.01); *G06K 9/00986* (2013.01); *G06K 9/2054* (2013.01); *G06K 9/46* (2013.01); *G06K 9/6202* (2013.01)

(58) Field of Classification Search
None
See application file for complete search history.

(56) References Cited

U.S. PATENT DOCUMENTS

| | | | |
|---|---|---|---|
| 6,711,293 | B1 | 3/2004 | Lowe |
| 9,721,186 | B2 | 8/2017 | Song |
| 9,953,137 | B2 | 4/2018 | Soon-Shiong |
| 10,007,862 | B2 * | 6/2018 | Gurwicz ............ G06K 9/00771 |

(Continued)

FOREIGN PATENT DOCUMENTS

WO 2015/004434 A1 1/2015

OTHER PUBLICATIONS

International Preliminary Report on Patentability issued in international Application No. PCT/US2019/023253 dated Jul. 17, 2020, 9 pages.

(Continued)

*Primary Examiner* — Samah A Beg
(74) *Attorney, Agent, or Firm* — Mauriel Kapouytian Woods LLP; Liang Huang; Andrew A. Noble

(57) ABSTRACT

Techniques are provided for multi-modal sensitive recognition. A digital data set for an object is obtained according to a modality, where the digital data set includes digital representations of the object at different values of a dimension of relevance of the modality. A reference location associated with the object is identified. A modal descriptor is derived for the modality according to an implementation of a multi-modal recognition algorithm by deriving a set of feature descriptors for the reference location and at the different values of the corresponding dimension of relevance, calculating a set of differences between the feature descriptors in the set of feature descriptors, and aggregating the set of differences into the modal descriptor. A device is then configured to initiate an action as a function of the modal descriptor.

54 Claims, 9 Drawing Sheets

(56) References Cited

U.S. PATENT DOCUMENTS

| | | |
|---|---|---|
| 2008/0208828 A1 | 8/2008 | Boiman et al. |
| 2010/0104158 A1* | 4/2010 | Shechtman ............. G06K 9/46 |
| | | 382/131 |
| 2013/0272548 A1 | 10/2013 | Visser et al. |
| 2014/0114675 A1 | 4/2014 | Soon-Shiong |
| 2015/0043828 A1* | 2/2015 | Valente .................. G06K 9/46 |
| | | 382/201 |
| 2015/0324998 A1* | 11/2015 | Song .................. G06F 16/5838 |
| | | 382/171 |
| 2017/0263019 A1 | 9/2017 | Song et al. |
| 2018/0089534 A1* | 3/2018 | Ye ........................ G06K 9/2018 |
| 2018/0218222 A1* | 8/2018 | Alrabeiah .......... G06K 9/00765 |
| 2020/0050208 A1* | 2/2020 | Frick ................. G06K 9/00664 |

OTHER PUBLICATIONS

International Search Report and Written Opinion issued in International Application No. PCT/US2019/023253 dated Jul. 4, 2019, 11 pages.

"New Fluorescent Dyes Could Advance Biological Imaging," www.hhmi.org/news/new-fluorescent-dyes-could-advance-biological-imaging, Sep. 2017, 3 pages.

* cited by examiner

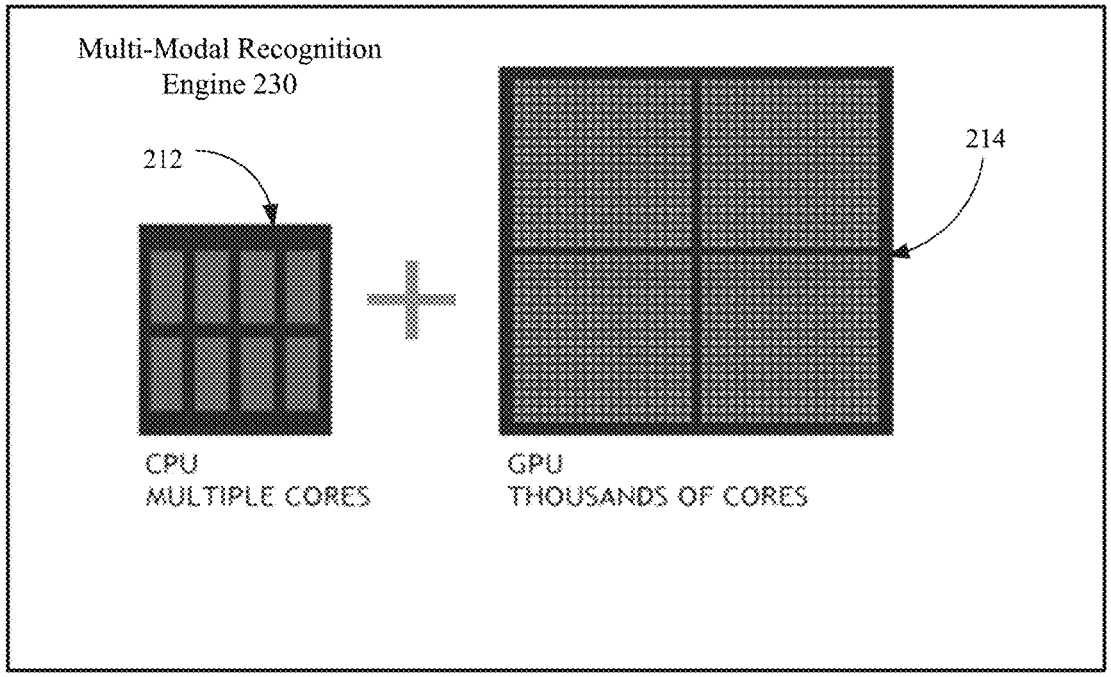

- Obtain set of differences from GPU
- Aggregate set of differences into at least one modal descriptor representing differences across different values of dimension of relevance
- Initiate action as a function of the at least one modal descriptor

- Receive first digital data set for at least one reference location associated with object
- Simultaneously derive, according to implementation of feature detection algorithm, set of feature descriptors for the at least one reference location and at the different values of corresponding dimension of relevance
- Simultaneously calculate set of differences between feature descriptors in set of feature descriptors

FIG. 3

Example Client-Server Relationship

700

710   720

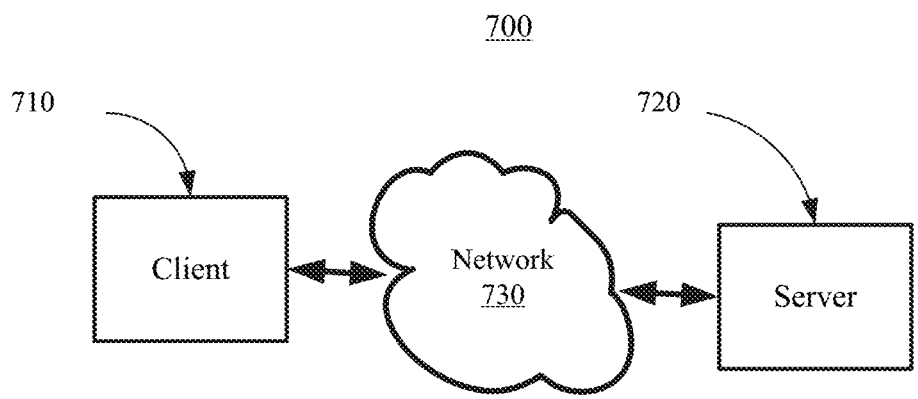

- Obtain first digital data set according to a first modality
- Select at least one reference location associated with object
- Derive, according to implementation of feature detection algorithm, set of feature descriptors for the at least one reference location and at the different values of corresponding dimension of relevance
- Calculate set of differences between feature descriptors in set of feature descriptors
- Aggregate set of differences into at least one modal descriptor representing differences across different values of dimension of relevance
- Configure device to initiate action as a function of the at least one modal descriptor
- Send first digital data set to server

- Receive the digital data set and at least one modal descriptor from client
- Search recognition databases or other databases
- Execute machine learning algorithms to improve recognition algorithms, modal descriptor algorithms, predictions of results, selections of actions, etc.
- Generate instructions to remotely control one or more operations device and/or stereoscopic camera sensor
- Store data relating to digital data set and/or the at least one modal descriptor

FIG. 7

VOLUMETRIC DESCRIPTORS

TECHNICAL FIELD

This disclosure relates generally to descriptors for use in digital recognition systems, and more specifically to multidimensional recognition descriptors.

BACKGROUND

Current technology makes it possible to capture a digital data set related to an object according to multiple modalities, including sound energy, radiant energy, electromagnetic energy, light energy, particle energy, magnetic energy, vibration energy, thermal energy, mechanical energy, gravitational energy, electrical energy, chemical energy, nuclear or atomic energy, ionization energy, chromodynamic energy, elastic energy, mechanical wave energy, and rest energy. Various feature descriptors determined using corresponding computer implementations of feature extraction algorithms used to represent features of a digital data set for object recognition purposes are well known. A very limited, but exemplary list of such feature extraction algorithms used in the context of digital images includes: Scale-Invariant Feature Transform (SIFT), Speeded Up Robust Features (SURF), DAISY, Transform Invariant Low-rank Textures (TILT), Gradient Location and Orientation Histogram (GLOH), Histograms of Oriented Gradient (HOG), Energy of image Gradient (EOG), Binary Robust Independent Elementary Features (BRIEF), Fast Retina Keypoint (FREAK), and many others. Typically, one or more of these algorithms are used to extract descriptors characterizing features in a digital data set and the resulting descriptors are used for recognizing or otherwise classifying or characterizing sensed objects corresponding to the data set. Different types of descriptors have been developed for different object sensing modalities (e.g., Markov random field (MRF) texture model or phased congruency-based binary pattern (PCBP) based feature descriptors for radio-frequency (RF) ultrasound data). However, different images (or other representations) of the same object are generally represented with separate sets of descriptors for each representation.

SUMMARY

There are many contexts in which the same object can be sensed within the same modality but using different parameter values. For example, a stereoscopic camera can measure objects using different values of various attributes (e.g., wavelength/frequencies, points of view, depth of field, etc.) in the context of a modality and track such values over time or other variations. While separate descriptor sets can be compiled for distinct images (or other representations) of the same object, embodiments of the present invention realize an opportunity to provide new and useful modal descriptors that capture representations of an object across variations in a dimension of interest (e.g., variations in time, frequency, wavelength, depth, power, or other parameters) using a unified modal descriptor (or descriptor set). Also, in a variety of fields there remains a need for an improved method for generating recognition descriptors that can describe an object in accordance with a modality so that computerized and automated actions (e.g., diagnoses, prognoses, identification, etc.) can be taken as a function of such descriptors.

Systems, methods, and articles of manufacture related to a computer-based multi-modal sensitive recognition system are described herein. Various embodiments use a modal recognition algorithm to derive a multidimensional modal descriptor associated with a modality and configure a device to initiate an action as a function of the multidimensional modal descriptor. For a variety of applications, a multi-modal sensitive recognition system can improve automated diagnostics, detection and reactions to changes over time.

In one embodiment, upon execution of a multi-modal recognition algorithm, a first digital data set is obtained according to a first modality, where the first digital data set includes digital representations of an object at different values of a first dimension of relevance of the first modality (e.g., wavelengths of light, frequency of sound, temperatures, etc.), where the different values of the first dimension of relevance may be spaced at regular or periodic intervals. At least one reference location or feature of the object is selected. At least one first modal descriptor is derived for the first modality by deriving, according to an implementation of a feature detection algorithm, a first set of feature descriptors for the at least one reference location and at the different values of the corresponding first dimension of relevance, calculating a first set of differences between the feature descriptors in the first set of feature descriptors, and aggregating the first set of differences into the at least one first modal descriptor representing differences across the different values of the first dimension of relevance. A device is then configured to initiate an action as a function of the at least one first modal descriptor.

In some embodiments, a second digital data set may be obtained according to a second modality, where the second digital data set includes digital representations of the object at different values of a second dimension of relevance of the second modality. At least one second modal descriptor may be derived for the second modality by deriving, according to an implementation of a second feature detection algorithm, a second set of feature descriptors for the at least one reference location and at the different values of the corresponding dimension of relevance, calculating a second set of differences between the feature descriptors in the second set of feature descriptors, and aggregating the second set of differences into the at least one second modal descriptor representing differences across the different values of the second dimension of relevance. The device may then be configured to initiate an action as a function of the at least one second modal descriptor.

In some embodiments, the first feature detection algorithm and the second feature detection algorithm may be different feature detection algorithms, and the first modality and the second modality may be different modalities.

Various objects, features, aspects and advantages of the inventive subject matter will become more apparent from the following specification, along with the accompanying drawings in which like numerals represent like components.

BRIEF DESCRIPTION OF THE DRAWINGS

FIG. 3 illustrates a block diagram of an exemplary CPU-GPU relationship that can be used for implementing one or more aspects of the various embodiments.

FIG. 7 illustrates a block diagram of an exemplary client-server relationship that can be used for implementing one or more aspects of the various embodiments.

Figure 1A:
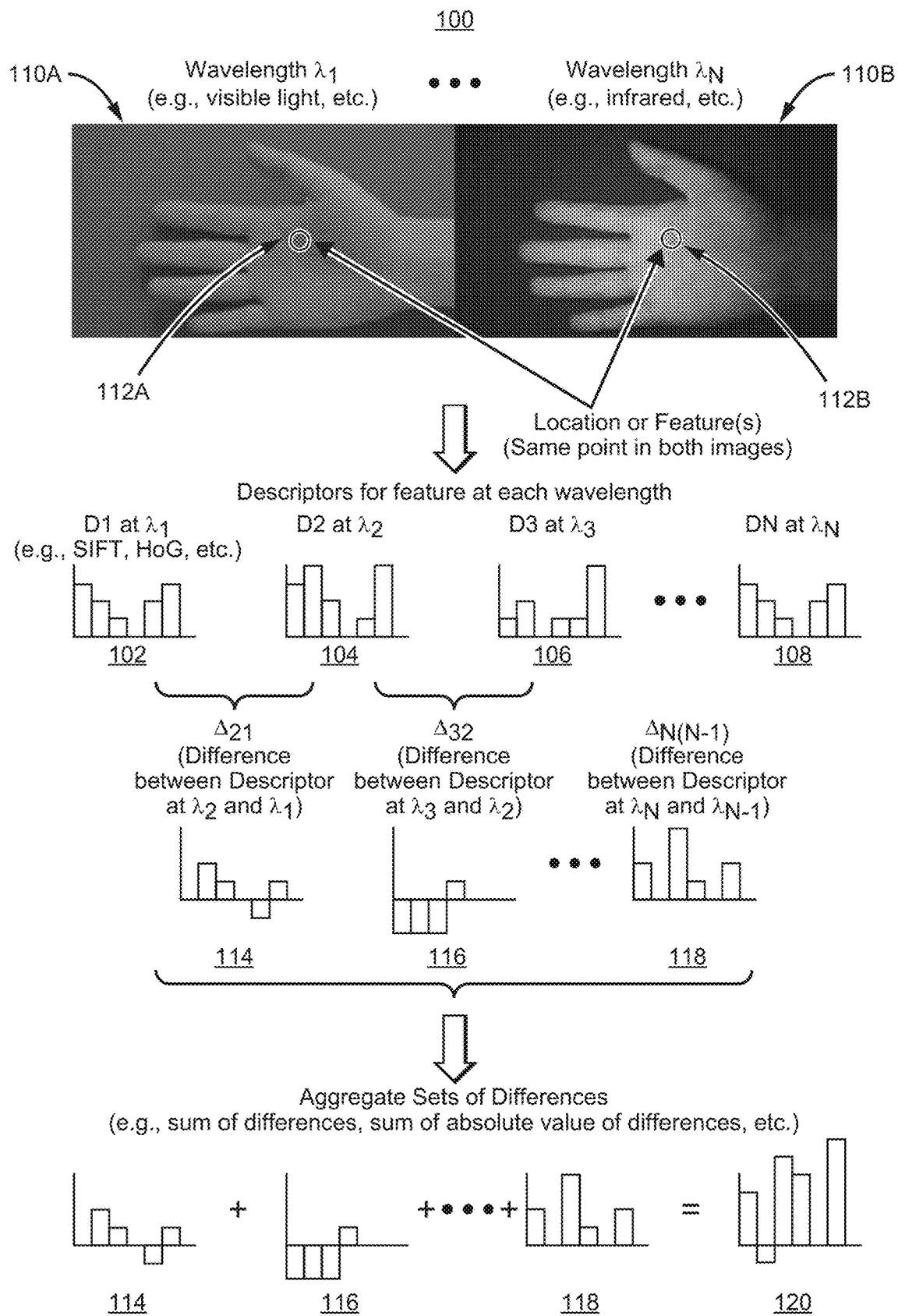
FIG. 1A illustrates an example of generating a single modal descriptor in accordance with an embodiment.

While the invention is described with reference to the above drawings, the drawings are intended to be illustrative, and other embodiments are consistent with the spirit, and within the scope, of the invention.

DETAILED DESCRIPTION

The various embodiments now will be described more fully hereinafter with reference to the accompanying drawings, which form a part hereof, and which show, by way of illustration, specific examples of practicing the embodiments. This specification may, however, be embodied in many different forms and should not be construed as being limited to the embodiments set forth herein; rather, these embodiments are provided so that this specification will be thorough and complete, and will fully convey the scope of the invention to those skilled in the art. Among other things, this specification may be embodied as methods or devices. Accordingly, any of the various embodiments herein may take the form of an entirely hardware embodiment, an entirely software embodiment or an embodiment combining software and hardware aspects. The following specification is, therefore, not to be taken in a limiting sense.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the invention may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", "the", and "at least one of" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, TPU, multi-core processors, etc.) that executes software instructions stored on a computer readable tangible, non-transitory medium (e.g., hard drive, solid state drive, RAM, flash, ROM, etc.). For example, a server can include one or more computers operating as a web server, database server, cloud server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element as a special-purpose processor to execute the set of functions on target data or data objects stored in the memory.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

The focus of the disclosed inventive subject matter is to enable construction or configuration of a computing device to operate on vast quantities of digital data, beyond the capabilities of a human for purposes including implementing a multi-modal sensitive recognition system.

One should appreciate that the disclosed techniques provide many advantageous technical effects including improving the scope, accuracy, compactness, efficiency, and speed of multi-modal sensitive recognition. It should also be appreciated that the following specification is not intended as an extensive overview, and as such, concepts may be simplified in the interests of clarity and brevity.

A multi-modal sensitive recognition system as described herein is based on the concept of a "modal" descriptor. Modal descriptors provide a means to characterize behavior at a reference location of or on an object in accordance with a modality such as, for example, sound energy, radiant energy, electromagnetic energy, light energy, particle energy, magnetic energy, vibration energy, thermal energy, mechanical energy, gravitational energy, electrical energy, chemical energy, nuclear or atomic energy, ionization energy, chromodynamic energy, elastic energy, mechanical wave energy, rest energy, etc. Further, modal descriptors are N-dimensional (i.e., multi-dimensional) descriptors where each dimension represents a different attribute in the context of a modality. Typical attributes (i.e., dimensions of relevance) may include, but are not limited to, time, wavelength, frequency, depth, scale, luminance, power, intensity, speed, distance, altitude, flowrate, temperature, resistance, capacitance, density, tensile strength, hardness, etc.

In an embodiment, a modal descriptor is associated with multiple steps, i.e., "sweeping", along a dimension of relevance $\delta$. Using wavelength (e.g., the spectrum from blue visible light to infrared) as an example, "sweeping" along the dimension of relevance may be described by the expression $\lambda_1, \lambda_2, \ldots, \lambda_n$, where $\Delta\lambda = \lambda_2 - \lambda_1$ is a step (e.g., 50 nm) along the dimension, and where each step $\Delta\lambda$ may be constant or may vary depending on circumstances. Alternatively, a modal descriptor may be associated with a continuous sweep along a dimension of relevance, e.g., the "steps" along the dimension of relevance may be represent by one or more higher order derivatives.

A multi-dimensional feature descriptor $D_1$ may be derived according to an implementation of a feature detection algorithm (e.g., SIFT, SURF, DAISY, TILT, GLOH, HOG, etc.) at each step $\lambda_i$ for $i=1$ to n. One should appreciate that when capturing a digital representation of an object at a specific step, say $\lambda_1$, it is expected that there is likely to be a slight distribution about the specific step, e.g., due to the nature of the capturing technology. For example, if a device is capturing an image of a person's hand at wavelength 550 nm, the device is likely capturing the image at a tight band of wavelengths distributed around 550 nm. For instance, the distribution of wavelengths might be between 548 nm and 552 nm, with an average wavelength of 550 nm. Thus, the disclosed techniques are considered to be focused on an average value for a specific step along the dimension of relevance. In more preferred embodiments, the distribution around the average is small relative to the distance between the steps, e.g., less than 25%, less than 15%, less than 10%, or more preferably less than 5% or even less than 1% of the distance between steps.

In an embodiment, the difference $\Delta D$ between each feature descriptor and another feature descriptor may be calculated, and the N−1 differences among the N steps may be aggregated to generate a single modal descriptor $\dot{D}_\delta = \Sigma \Delta D$. In an exemplary embodiment, the absolute value of the difference between each feature descriptor and its next neighbor ($|D_{i+1} - D_i|$) may be used to calculate the n−1 differences. However, other calculations that do not include an absolute value of ($D_{i+1} - D_i$) may be equally suitable. Moreover, the differences may be calculated between every other feature descriptor, every third feature descriptor, etc. as desired. Thus, "sweeping" along a dimension also may be characterized as a difference equation $\Delta D/\Delta\lambda$, which may be written as a derivative, MIA, in the context of wavelength, or generically as $\partial D/\partial \delta$. It should be noted that the modal descriptor $\dot{D}_\delta$ does not have to be a sum of differences. Rather, in various embodiments, a modal descriptor $\dot{D}_\delta$ can be generated using any form of aggregation across the sweep of the dimension of relevance, e.g., a Euclidian distance, a Hamming distance, a polarity, a deviation, a dissimilarity, a contrast, a distinction, a differentiation, a variance, a variation, a divergence, a disparity, a gap, an imbalance, an absolute value, a contradiction, a dot product, a vector difference, etc.

Further, it should be noted that the single modal descriptor $\dot{D}_\delta$ may have the same number of dimensions as the feature descriptors $D_i$, or may be normalized, e.g., to a highest bin or to unity, and then scaled. For example, a modal descriptor $\dot{D}_\delta$ that is derived from SIFT descriptors, which typically have 128 dimensions, may have 128 dimensions as well. However, a modal descriptor $\dot{D}_\delta$ may have more dimensions or fewer dimensions than the feature descriptors from which it is derived. For example, an extra dimension (e.g., a $129^{th}$ dimension) could be added that includes a number representing how many of $D_i$ (1 to N) have non-zero descriptors. In such a scenario, the extra dimension may indicate that as one sweeps along the dimension of relevance, there might be some values of $\delta$ that do not have a descriptor or have a degenerate descriptor, i.e., $D_i = [0 \ldots, 0]$.

As such, modal descriptors $\dot{D}_\delta$ may be generated at different values of one or more dimensions of relevance, and each $\dot{D}_\delta$ may then be used for matching purposes (e.g., k-nearest neighbor analysis, spill trees, etc.). Thus, a set of $\dot{D}_\delta$ can be described as forming a volumetric descriptor in a dimensional ($\delta$) space.

Figure 1B:
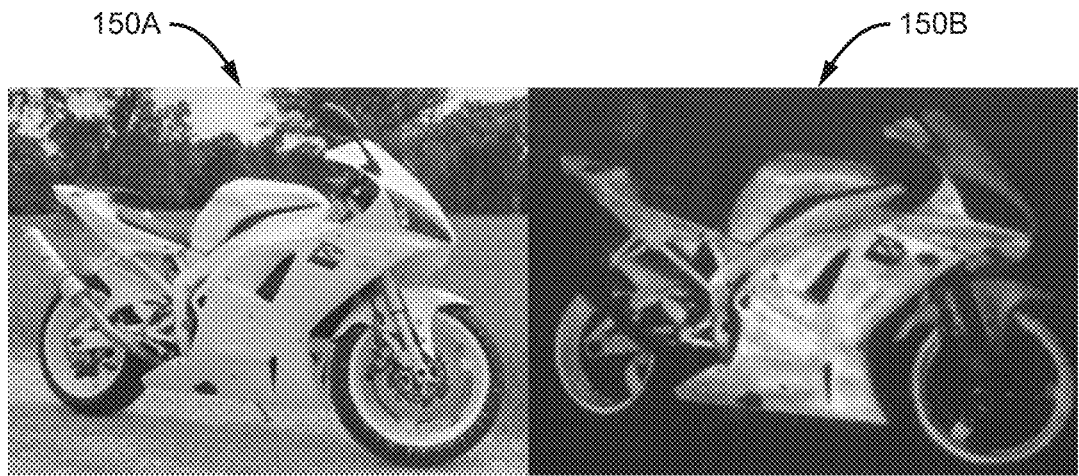
FIG. 1B illustrates an example of generating a single modal descriptor in accordance with an embodiment.
Figure 1C:
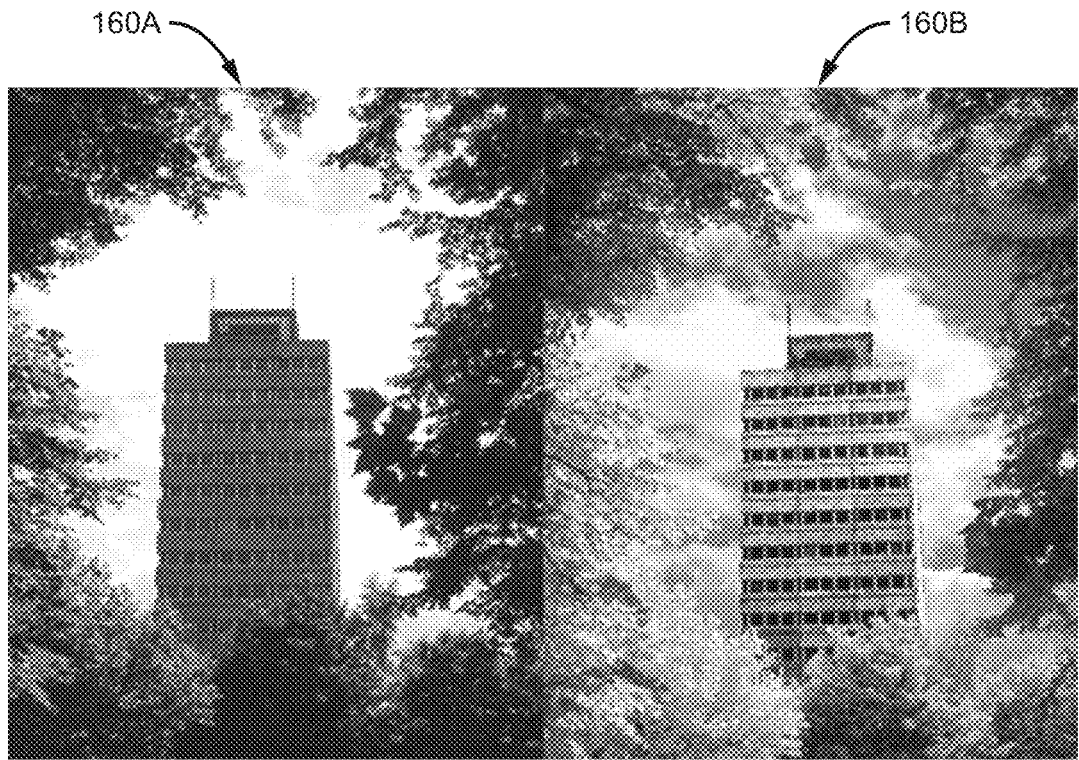
FIG. 1C illustrates an example of generating a single modal descriptor in accordance with an embodiment.

FIG. 1A illustrates an example of generating a single modal descriptor in accordance with an embodiment. In diagram 100, a plurality of feature descriptors ($D_1$ 102, $D_2$ 104, $D_3$ 106 . . . $D_N$ 108) are obtained from multiple digital representations (110A, 110B, etc.) of an object, which in this instance is a patient's hand. In other instances, the plurality of feature descriptors ($D_1$ 102, $D_2$ 104, $D_3$ 106 . . . $D_N$ 108) may be obtained from multiple digital representations (150A, 150B, etc.) of a vehicle as shown in FIG. 1B, multiple digital representations (160A, 160B, etc.) of a building as shown in FIG. 1C, or multiple digital representations of other types of objects.

Returning to FIG. 1A, the plurality of feature descriptors ($D_1$ 102, $D_2$ 104, $D_3$ 106 ... $D_N$ 108) are depicted as histograms associated with multiple steps at a same reference location or feature, i.e., "sweeping", along a dimension of relevance δ (e.g., wavelength λ). For example, each of the feature descriptors $D_1$ 102, $D_2$ 104, $D_3$ 106 ... $D_N$ 108 may be a descriptor generated for reference location or feature 112A and 112B at different wavelengths (i.e., at different values of a modality). As shown, the digital representation of same reference location or feature 112A, 112B may change in appearance during a sweep from $\lambda_1$ to $\lambda_N$. For example, certain image features may be derived from point of interest 112A at $\lambda_1$ (e.g., a visible light wavelength), while other image features may be derived from the same point of interest 112B at $\lambda_N$ (e.g., an infrared wavelength). The feature descriptors $D_1$ 102, $D_2$ 104, $D_3$ 106 ... $D_N$ 108 may be derived according to an implementation of a feature detection algorithm (e.g., SIFT, SURF, DAISY, TILT, GLOH, HOG, etc.) at each step λi for i=1 to N.

In an embodiment, differences ΔD 114, 116, and 118, between each feature descriptor and another feature descriptor (e.g., differences between a descriptor and a neighboring descriptor) may be derived or calculated, and the n−1 differences may be aggregated (e.g., summed) to generate a single modal descriptor 120, given by: $\dot{D}_\delta = \Sigma \Delta D$. As described above, the absolute value of the difference between each feature descriptor and its next neighbor (|Di+1−Di|) may be used to calculate the N−1 differences, or other calculations that do not include an absolute value of (Di+1−Di) may be used. For example, the sum may be a raw sum (as shown), which would allow for negative bin values. However, in more preferred embodiments, a sum of absolute values may be used rather than a raw sum, i.e., the resulting bins in modal descriptor 120 would be either all positive or zero. Moreover, the differences may be calculated between every other feature descriptor, every third feature descriptor, etc. as desired. Further, the modal descriptor $\dot{D}_\delta$ may be generated using a sum of differences, or any form of aggregation across the sweep of the dimension of relevance, e.g., a Euclidian distance, a Hamming distance, a polarity, a deviation, a dissimilarity, a contrast, a distinction, a differentiation, a variance, a variation, a divergence, a disparity, a gap, an imbalance, an absolute value, a contradiction, etc.

In some embodiments, the computer-based multi-modal sensitive recognition system may comprise at least one sensor capable of acquiring the multiple digital representations according to a first modality. The at least one sensor may comprise at least one of a visible light camera, a camera assembly, an infrared sensor, a UV sensor, a transducer, a LIDAR sensor, a structured-light 3D sensor, a hyperspectral sensor, an acoustic, sound, or vibration sensor, an automotive or transportation sensor, a chemical sensor, an electric current, electric potential, magnetic, or radio sensor, an environment, weather, moisture, or humidity sensor, a flow or fluid velocity sensor, an ionizing radiation or subatomic particle sensor, a navigation instrument, a radar sensor, a radiation sensor, a thermal sensor, an ultrasonic transducer, an accelerometer, a pressure sensor, a touch-based switch, a tilt sensor, a speed sensor, a passive infrared sensor, a proximity or presence sensor, a force, density, or level sensor, a position, angle, displacement, distance, speed, or acceleration sensor, a Hall probe, and a heartbeat sensor.

In some embodiments, the reference location may be selected and may include, but is not limited to, at least one of a facial feature, a corner, an edge, a gradient, a texture, a physical feature, a tissue, an organ, a tumor, a lesion, a bone, an appendage, a surface feature, a pattern, a logo, a label, a marker, an index location, and a symbol. In at least some instances, the reference location may also comprise an orientation. Thus, the reference location can be considered an anchor point for which descriptors can be generated as one sweeps the dimension of relevance.

In some embodiments, the feature detection algorithm may include an implementation of at least one of a Scale-Invariant Feature Transform (SIFT), multidimensional SIFT (n-SIFT), principal component analysis SIFT (PCA-SIFT), affine SIFT (ASIFT), color space SIFT (CSIFT), Speeded Up Robust Features (SURF), DAISY, Transform Invariant Low-rank Textures (TILT), Gradient Location and Orientation Histogram (GLOH), Histograms of Oriented Gradient (HOG), Energy of image Gradient (EOG), Binary Robust Independent Elementary Features (BRIEF), Fast Retina Keypoint (FREAK), Canny, Sobel, Kayyali, Harris, Plessey, Shi-Tomasi, SUSAN, level curve curvature, FAST, Laplacian of Gaussian (LoG), Difference of Gaussians (DoG), Determinant of Hessian (DoH), Maximally stable extremal regions (MSER), linear-time MSER, Extended MSER (X-MSER), parallel MSER, PCBR, grey-level blob, edge detection, blob detection, corner detection, ridge detection, Hough transform, affine invariant feature detection, affine shape adaptation, Harris affine, and Hessian affine algorithm. The feature detection algorithm may further include Markov random field (MRF) texture model, phased congruency-based binary pattern (PCBP), and spatial statistics-based algorithms for radio-frequency (e.g., ultrasound) data. Note that when generating descriptors as the dimension of relevance is swept, a "feature" might not be visible at the specific value of the dimension. For example, a SIFT descriptor might not be present at low values of wavelengths but might be present at higher wavelengths. Thus, the inventive subject matter is considered to include establishing a location or anchor point by sweeping across the dimension of relevance and/or using other visible features (e.g., visible lines, curves, edges, etc.) to establish a relative or absolute position (and, in some instances, orientation) on the object for the location.

In some embodiments, the first set of differences may include one or more of an absolute value of the differences, a Euclidian distance, a Hamming distance, a polarity, a deviation, a dissimilarity, a contrast, a distinction, a differentiation, a variance, a variation, a divergence, a disparity, a gap, an imbalance, and a contradiction.

In some embodiments, a computer-based multi-modal sensitive recognition system may comprise a device which may include at least one of a medical device, a server, an appliance, a vehicle, an input device, an output device, a storage device, a display unit, a robot, a headset, a steering wheel, a joystick, a microphone, a headphone, a speaker, a touch screen, and a projector. In some embodiments, the device may comprise a mobile device which may include handheld mobile devices or other mobile devices. For example, a mobile device could include at least one of a smartphone/cell phone, a scanner, a camera assembly, a medical device, a drone, a vehicle, a robot, a virtual reality (VR) or augmented reality (AR) headset, a laptop, a netbook, a tablet PC, an ultra-mobile PC (UMPC), a Mobile Internet Device (MID), a smartphone, a PDA, an e-reader, and a game console.

In some embodiments, the modal descriptors $\dot{D}_\delta$ may be used to configure a device to initiate an action which may include at least one of a database look-up using the at least one first modal descriptor as an index, logging an event in a database record based on the at least one first modal descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, and capturing a digital representation of a scene.

Figure 2:
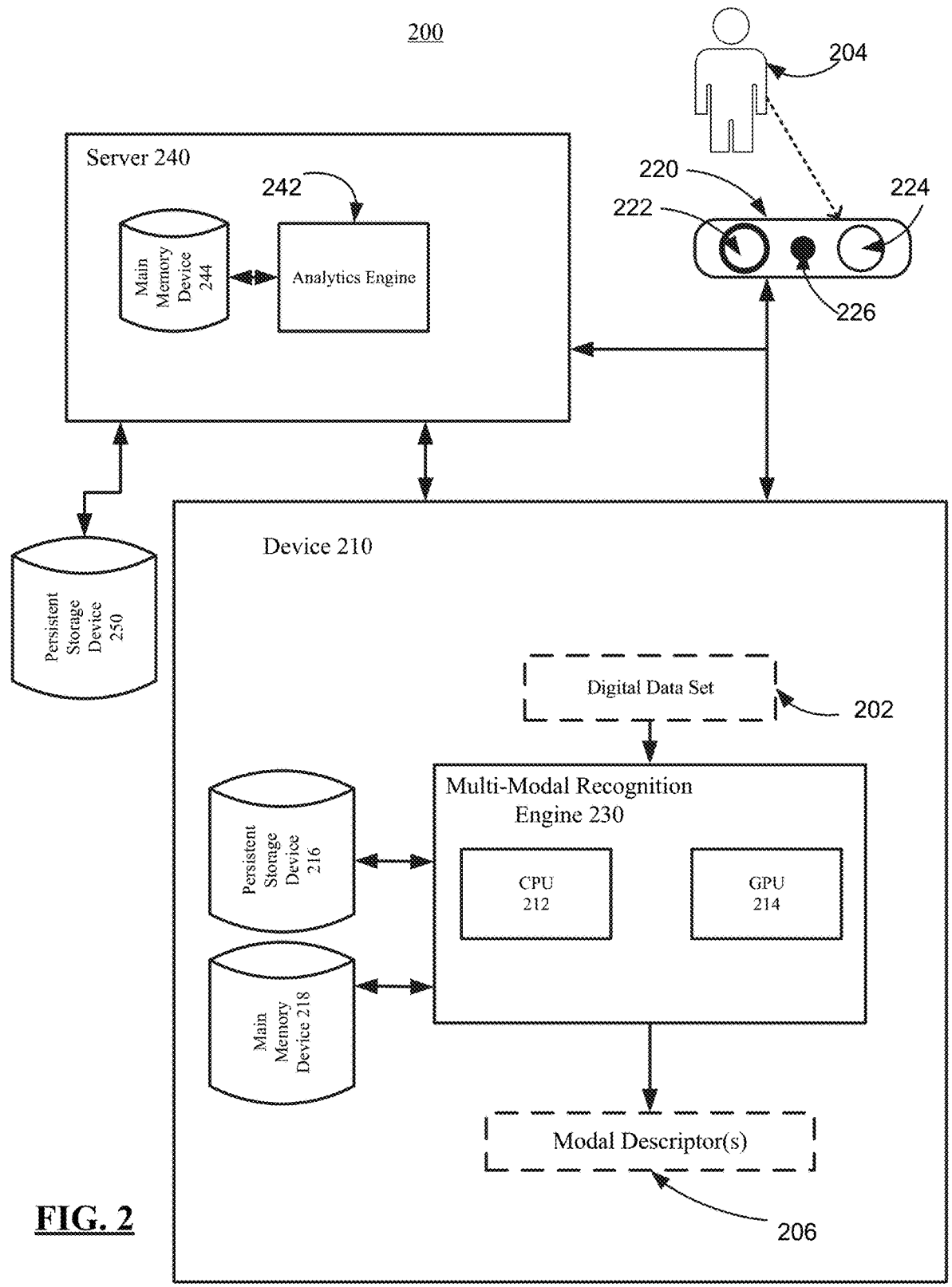
FIG. 2 illustrates a block diagram of a multi-modal sensitive recognition system for generating modal descriptors in accordance with an embodiment.

FIG. 2 illustrates a block diagram of a multi-modal sensitive recognition system for generating modal descriptors in accordance with an embodiment. In block diagram 200, elements for multi-modal sensitive recognition include device 210, camera sensor 220, multi-modal recognition engine 230, server 240, and persistent storage device 250. In an embodiment, device 210 is configured to obtain a digital data set 202 comprising digital representations of object 204 (e.g., a patient) in accordance with a modality at different values of a dimension of relevance (e.g., time, frequency, etc.). For example, digital data set 202 may be related to sound energy, radiant energy, electromagnetic energy, light energy, particle energy, magnetic energy, vibration energy, thermal energy, mechanical energy, gravitational energy, electrical energy, chemical energy, nuclear or atomic energy, ionization energy, chromodynamic energy, elastic energy, mechanical wave energy and rest energy, or other types of modalities.

In an embodiment, at least some of digital data set 202 may be acquired using camera sensor 220, which may be a stereoscopic camera directed or controlled by device 210 and/or server 240. For example, camera sensor 220 (e.g., Intel® Corp.'s RealSense™ camera) may include an assembly of various camera sensors, e.g., IR camera sensor 222, color camera sensor 224, and laser camera sensor 226, to acquire real-time observations of object 204. While exemplary, it should be noted that camera sensor 220 does not have to be a stereoscopic camera. For example, camera sensor 220 may comprise a monoscopic camera, e.g., with an electronic filter and stereo extrapolation for movement, or another type of camera system. Further, at least some of digital data set 202 may be obtained from either one or both of persistent storage device 216 and main memory device 218 within device 210, or either one or both of main memory device 244 within server 240 and persistent storage device 250.

In an embodiment, device 210, e.g., a tablet, smartphone, medical device, or other type of device, may comprise multi-modal recognition engine 230, which may be configured to receive digital data set 202 and execute one or more of the methods described herein to determine at least one modal descriptor 206 related to object 204. In an embodiment, multi-modal recognition engine 230 may be configured to parallelize one or more processes for deriving modal descriptors. For example, multi-modal recognition engine 230 may be in communication with or comprise one or more central processing units (CPUs) 212 and graphics processing units (GPUs) 214 for generating at least one modal descriptor 206. As such, each CPU 212 and GPU 214 of multi-modal recognition engine 230 may be assigned certain tasks related to generating (e.g., calculate feature descriptors, aggregate, etc.) and/or tracking modal descriptors associated with one or more dimensions of relevance δ or modalities. For example, GPU 214 may employ a parallel architecture comprising multiple cores designed for handling multiple tasks simultaneously, e.g., deriving feature descriptors for one or more modalities and calculating differences ΔD between each feature descriptor and another feature descriptor as described above, while CPU 212 may perform one or more serial processes, e.g., aggregating the n−1 differences to generate single modal descriptor(s) 206 ($\ddot{D}_\delta = \Sigma \Delta D$).

In an embodiment, device 210 be configured as a function of the at least one modal descriptor 206 to initiate an action. For example, the action may include at least one of a database look-up using the modal descriptor as an index, logging an event in a database record based on the model descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, capturing a digital representation of a scene, or another action.

In some embodiments, server 240 may obtain and process data relating to digital data set 202 and/or the at least one modal descriptor 206 from device 210 and/or camera sensor 220. For example, server 240 may comprise analytics engine 242 which may process data relating to digital data set 202 and/or the at least one modal descriptor 206 for the purposes of, e.g., remotely controlling one or more operations of device 210 and/or camera sensor 220, searching recognition databases or other databases along with executing machine learning algorithms to improve, for example, recognition algorithms, modal descriptor algorithms, predictions of results, selections of actions, etc. In an embodiment, data processed by analytics engine 242 may be displayed to a user at server 240 such that one or more operations of device 210 and/or camera sensor 220 (e.g., the type of modality being used for the digital data set, dimension of relevance, aggregation technique, etc.) may be selected or adjusted. Moreover, analytics engine 242 may be configured to store data relating to digital data set 202 and/or the at least one modal descriptor 206 in at least one of server main memory device 244 and persistent storage device 250.

It should be noted that the elements in FIG. 2, and the various functions attributed to each of the elements, while exemplary, are described as such solely for the purposes of ease of understanding. One skilled in the art will appreciate that one or more of the functions ascribed to the various elements may be performed by any one of the other elements, and/or by an element (not shown) configured to perform a combination of the various functions. Therefore, it should be noted that any language directed to a device, a stereoscopic camera sensor, a multi-modal recognition engine, a server, main memory devices and a persistent storage devices should be read to include any suitable combination of computing devices, including servers, interfaces, systems, databases, agents, peers, engines, controllers, modules, or other types of computing devices operating individually or collectively to perform the functions ascribed to the various elements. Further, one skilled in the art will appreciate that one or more of the functions of the system of FIG. 2 described herein may be performed within the context of a client-server relationship, such as by one or more servers, one or more client devices (e.g., one or more user devices) and/or by a combination of one or more servers and devices.

FIG. 3 illustrates a block diagram of an exemplary CPU-GPU relationship that can be used for implementing one or more aspects of the various embodiments. In relationship 300, Multi-modal recognition engine 230 may be configured to receive digital data set 202 and derive at least one modal descriptor 206 using CPU 212 and GPU 214. In an embodiment, multi-modal recognition engine 230 may divide processing tasks between CPU 212 and GPU 214. For example, GPU 214, which may have a parallel architecture comprising thousands of cores designed to process parallel workloads simultaneously and efficiently, may be configured to simultaneously derive feature descriptors (e.g., by executing one or more feature detection algorithms) for one or more modalities or dimensions of relevance in parallel and simultaneously calculate differences ΔD between each feature descriptor and another feature descriptor as described above. CPU 212 may then be configured to receive the differences ΔD from GPU 214 and aggregate the differences to generate a single modal descriptor (e.g., $\dot{D}_\delta=\Sigma\Delta D$, $\dot{D}_\delta=\Sigma|\Delta D|$, etc.).

It should be noted that the various functions attributed to each of the elements in FIG. 3, while exemplary, are described as such solely for the purposes of example. One skilled in the art will appreciate that one or more of the functions ascribed to CPU 212 and GPU 214 may be performed by the other element, and/or by an element (not shown) configured to perform a combination of the various functions. Further, one skilled in the art will appreciate that one or more steps of the functions of multi-modal recognition engine 230 described herein may be performed using either or both of CPU 212 and GPU 214 using variety of different processing operations or combinations of processing operations.

Figure 4:
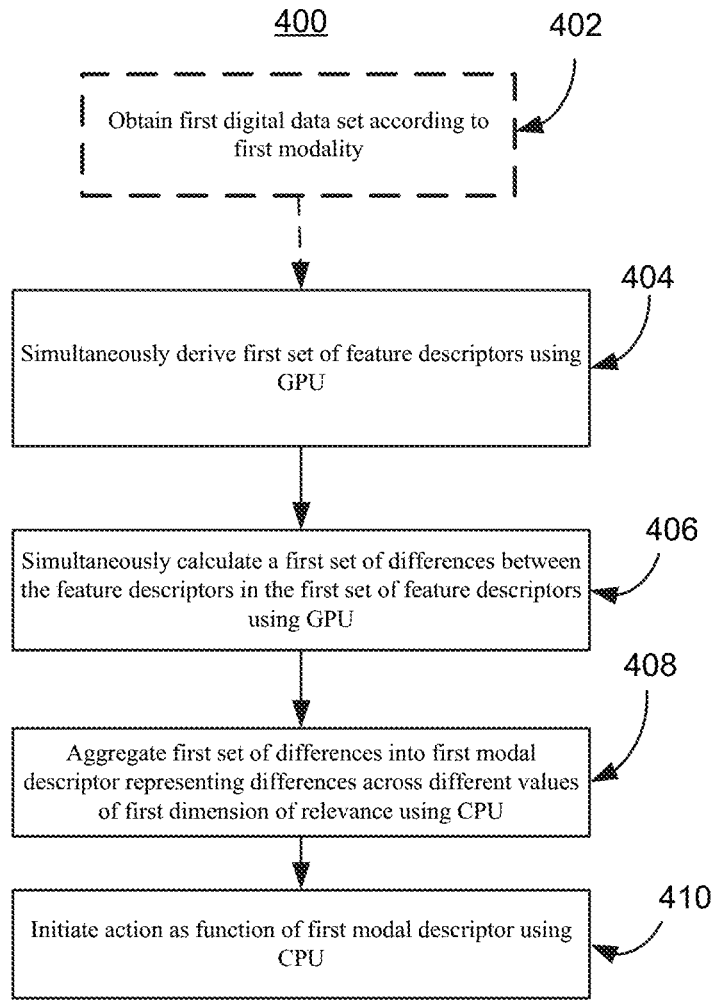
FIG. 4 illustrates a flow diagram of example operations for multi-modal sensitive recognition in accordance with an embodiment.

FIG. 4 illustrates a flow diagram of example operations for multi-modal sensitive recognition in accordance with an embodiment. The computer-based multi-modal sensitive recognition system 200 described above in FIG. 2 may implement the steps of flow diagram 400. For example, the computer-based multi-modal sensitive recognition system may comprise a multi-modal recognition engine, e.g., multi-modal recognition engine 230, for implementing one or more of the processing and/or storage steps in flow diagram 400.

At step 402, upon execution of a multi-modal recognition algorithm, a first digital data set according to a first modality is obtained, e.g., from camera sensor 220.

At step 404, GPU 214 is configured to simultaneously derive a first set of feature descriptors based on the digital data set for a selected reference location associated with an object. For example, GPU 214 may use multiple processing cores to simultaneously calculate the first set of feature descriptors for the selected reference location and at the different values of a corresponding first dimension of relevance feature descriptors according to an implementation of a feature detection algorithm.

At step 406, GPU 214 is configured to simultaneously calculate a first set of differences between the feature descriptors in the first set of feature descriptors. For example, GPU 214 may be configured to simultaneously calculate differences between every other feature descriptor, every third feature descriptor, etc. as desired.

After receiving the first set of differences from GPU 214, CPU 212 is configured to aggregate the first set of differences into the at least one first modal descriptor representing differences across the different values of the first dimension of relevance at step 408. For example, CPU 212 may be configured to use one or more processing cores to perform one or more operations for determining a sum, a Euclidian distance, a Hamming distance, a polarity, a deviation, a dissimilarity, a contrast, a distinction, a differentiation, a variance, a variation, a divergence, a disparity, a gap, an imbalance, an absolute value, a contradiction, or another aggregation of the first set of differences. At step 410, CPU 212 is configured to initiate an action (e.g., a database look-up using the at least one first modal descriptor as an index, logging an event in a database record based on the at least one first modal descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, capturing a digital representation of a scene, etc.) as function of first modal descriptor.

Figure 5:
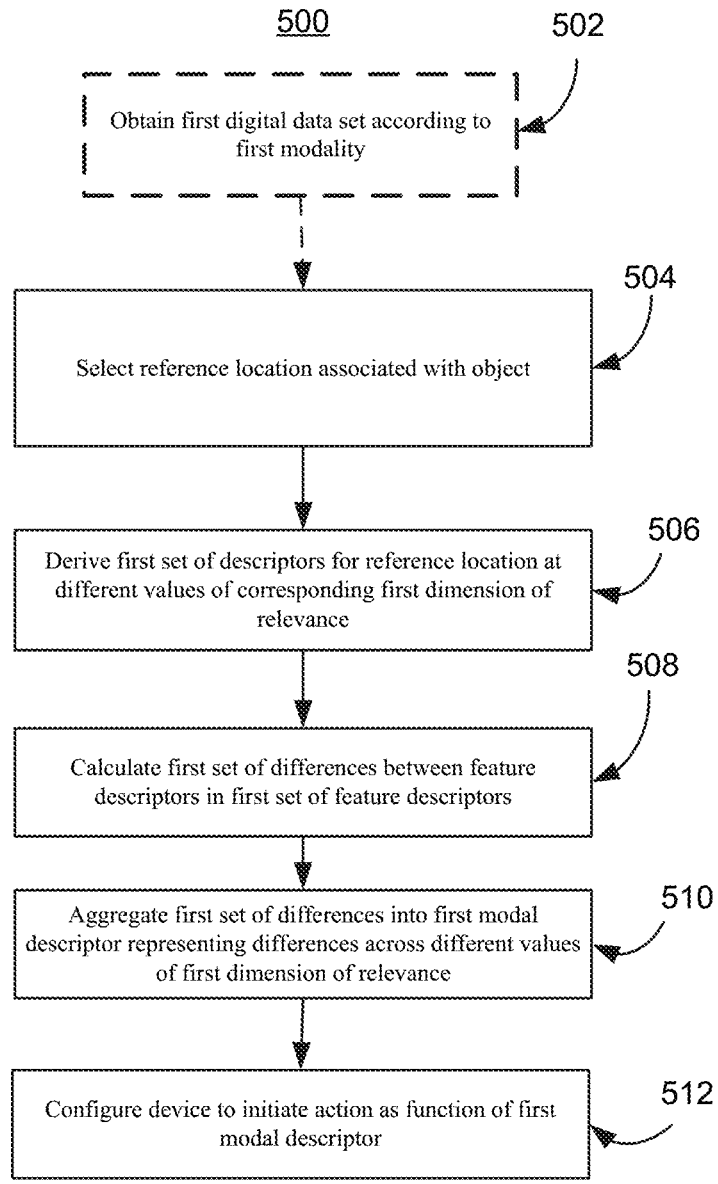
FIG. 5 illustrates a flow diagram of example operations for multi-modal sensitive recognition in accordance with an embodiment.

FIG. 5 illustrates a flow diagram of example operations for multi-modal sensitive recognition in accordance with an embodiment. The computer-based multi-modal sensitive recognition system 200 described above in FIG. 2 may implement the steps of flow diagram 500. For example, the computer-based multi-modal sensitive recognition system may comprise a device, e.g., device 210, that implements one or more of the processing and/or storage steps in flow diagram 500.

At step 502, upon execution of a multi-modal recognition algorithm, a first digital data set according to a first modality is obtained. For example, the first modality may include at least one of sound energy, radiant energy, electromagnetic energy, light energy, particle energy, magnetic energy, vibration energy, thermal energy, mechanical energy, gravitational energy, electrical energy, chemical energy, nuclear or atomic energy, ionization energy, chromodynamic energy, elastic energy, mechanical wave energy and rest energy. In an embodiment, the first digital data set includes digital representations of an object at different values of a first dimension of relevance of the first modality. For example, computer-based multi-modal sensitive recognition system 200 may comprise at least one sensor, e.g., camera sensor 220, which can acquire the digital representations according to the first modality. For example, the at least one sensor may include at least one of a visible light camera, an infrared sensor, a UV sensor, a transducer, a LIDAR sensor, a structured-light 3D sensor, a hyperspectral sensor, an acoustic, sound, or vibration sensor, an automotive or transportation sensor, a chemical sensor, an electric current, electric potential, magnetic, or radio sensor, an environment, weather, moisture, or humidity sensor, a flow or fluid velocity sensor, an ionizing radiation or subatomic particle sensor, a navigation instrument, a radar sensor, a radiation sensor, a thermal sensor, an ultrasonic transducer, an accelerometer, a pressure sensor, a touch-based switch, a tilt sensor, a speed sensor, a passive infrared sensor, a proximity or presence sensor, a force, density, or level sensor, a position, angle, displacement, distance, speed, or acceleration sensor, a heartbeat sensor, or other sensors or combinations of sensors. In an embodiment, the at least one sensor may comprise a plurality of sensors, e.g., IR camera sensor 222, color camera sensor 224, and laser camera sensor 226. Further, in various medical applications, the digital representations may be acquired using various types of imaging. For example, a portion of a patient may be captured using thermal (e.g., depending on a tissue state, etc.), IR, visible, UV, particle (e.g., alpha, beta, etc.), ultrasound (wavelength(s)), MRI, PET, CAT, Gamma, tomography, fluoroscopy, and radiography-based imaging.

The first dimension of relevance may include at least one of time, wavelength, frequency, depth, scale, luminance, power, intensity, speed, flowrate, or other dimensions. In some embodiments, the different values of the first dimension of relevance may be spaced at regular intervals, e.g., time intervals, frequency intervals, etc. However, the values of the first dimension of relevance also may be spaced at irregular intervals, e.g., based on a threshold that occurs only under certain conditions.

At step 504, at least one reference location associated with the object is selected. For example, the selected reference location may comprise at least one of a facial feature (e.g., a mole, bruise, scab, etc.), a corner, an edge, a gradient, a texture, a physical feature, a tissue, an organ, a tumor, a lesion, a bone, an appendage, a surface feature, a pattern, a logo, a label, a marker (e.g., a dye or stain), an index location, or a symbol associated with the object. The at least one reference location also may include an orientation in some instances. In some embodiments, a reference feature may be selected for monitoring over time, e.g., to discern various changes, the progress of a treatment, or a worsening condition. In other embodiments, a reference feature may be selected as a landmark for another feature or set of features that may be monitored or observed based on a dimension of relevance (e.g., time, wavelength, etc.).

At least one first modal descriptor is derived for the first modality by deriving, according to an implementation of a first feature detection algorithm at step 506, a first set of feature descriptors for the at least one reference location and at the different values of the corresponding first dimension of relevance. For example, the first feature detection algorithm may include an implementation of at least one of a Scale-Invariant Feature Transform (SIFT), multidimensional SIFT (n-SIFT), principal component analysis SIFT (PCA-SIFT), affine SIFT (ASIFT), color space SIFT (CSIFT), Speeded Up Robust Features (SURF), DAISY, Transform Invariant Low-rank Textures (TILT), Gradient Location and Orientation Histogram (GLOH), Histograms of Oriented Gradient (HOG), Energy of image Gradient (EOG), Binary Robust Independent Elementary Features (BRIEF), Fast Retina Keypoint (FREAK), Canny, Sobel, Kayyali, Harris, Plessey, Shi-Tomasi, SUSAN, level curve curvature, FAST, Laplacian of Gaussian (LoG), Difference of Gaussians (DoG), Determinant of Hessian (DoH), Maximally stable extremal regions (MSER), linear-time MSER, Extended MSER (X-MSER), parallel MSER, PCBR, grey-level blob, edge detection, blob detection, corner detection, ridge detection, Hough transform, affine invariant feature detection, affine shape adaptation, Harris affine, and Hessian affine algorithm. For embodiments related to radio-frequency (e.g., ultrasound) data, the first feature detection algorithm may include an implementation of at least one of a Markov random field (MRF) texture model, phased congruency-based binary pattern (PCBP), and spatial statistics-based algorithm.

The first modal descriptor may be further derived by calculating a first set of differences between the feature descriptors in the first set of feature descriptors at step 508 and aggregating the first set of differences into the at least one first modal descriptor representing differences across the different values of the first dimension of relevance at step 510. For example, the first set of differences may include one or more of an absolute value of the differences, a Euclidian distance, a Hamming distance, a polarity, a deviation, a dissimilarity, a contrast, a distinction, a differentiation, a variance, a variation, a divergence, a disparity, a gap, an imbalance, and a contradiction. In some embodiments, the at least one first modal descriptor may comprise a sum across the first set differences. However, in other embodiments the at least one first modal descriptor may be generated using any form of aggregation across the sweep of the dimension of relevance, such as, for example, a Euclidian distance, a Hamming distance, a polarity, a deviation, a dissimilarity, a contrast, a distinction, a differentiation, a variance, a variation, a divergence, a disparity, a gap, an imbalance, an absolute value, or a contradiction.

In an embodiment, the at least one first modal descriptor may have at least as many dimensions as a descriptor derived from the feature detection algorithm, while in other embodiments, the at least one first modal descriptor may have more dimensions than a descriptor derived from the first feature detection algorithm. In addition, the at least one first modal descriptor may be normalized, e.g., based on values or circumstances of previous modal descriptors or descriptors derived from the first feature detection algorithm.

At step 512, a device is configured to initiate an action as a function of the at least one first modal descriptor. For example, the device may include at least one a tablet, a smartphone, a medical device, a server, an appliance, a game console, a vehicle, an input device, an output device, a storage device, a display unit, a camera, a robot, a headset, a steering wheel, a joystick, a microphone, a headphone, a speaker, a touch screen, and a projector. The action may include at least one of a database look-up using the modal descriptor as an index, logging an event in a database record based on the model descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, capturing a digital representation of a scene, or another action.

In some embodiments, a second digital data set may be obtained according to a second modality as in step 502, where the second digital data set includes digital representations of the object at different values of a second dimension of relevance of the second modality. At least one second modal descriptor may be derived for the second modality as in steps 506, 508, and 510 by deriving, according to an implementation of a second feature detection algorithm, a second set of feature descriptors for the at least one reference location and at the different values of the corresponding dimension of relevance, calculating a second set of differences between the feature descriptors in the second set of feature descriptors, and aggregating the second set of differences into the at least one second modal descriptor representing differences across the different values of the dimension of relevance. The device may then be configured to initiate an action as a function of at least the second modal descriptor as in step 512. In some embodiments, the first feature detection algorithm and the second feature detection algorithm may be different feature detection algorithms, and the first modality and the second modality may be different modalities.

The operations for multi-modal sensitive recognition described above may be applied in a variety of use cases. For example, in medical use cases one or more modal descriptors related to one or more modalities (e.g., in a doctor's office, hospital, security and/or police station, etc.) may be used to monitor development and/or healing of bruises, detect sub-surface bruises (e.g., muscle bruises, bone bruises, etc.), and monitor and/or detect a state of scab healing. For example, a modal descriptor (e.g., based on a thermal energy modality) may be utilized to determine where healing has occurred under a scab or at an edge of a scab, or to measure or detect areas of skin that are burned for a burn victim. Other modal descriptors may be utilized to determine where drugs (e.g., ointments) should be administered.

In an embodiment, tissues regions may be stained or tagged with "contrasts" to accentuate their presentation according to a specific modality. For example, contrasts such as fluorescent dyes (e.g., rhodamine dyes as described at URL www.hhmi.org/news/new-fluorescent-dyes-could-advance-biological-imaging) may be employed to cause tissues and/or other physical features to become more prominent. Modal descriptors derived from the contrasts may in turn be used to create tissue level and body level human object identifiers, such as described in US20140114675 titled "Healthcare Management Objects" to Soon-Shiong and US20140012843 titled "Healthcare Analysis Stream Management" to Soon-Shiong, which may be used to track or identify a patient, e.g., for the purposes of developing a "one-click cure" type system.

In an embodiment, tissue information may be captured in multiple spectrums (e.g., scanning for melanoma). For example, a stereoscopic camera sensor 160, e.g., the Intel® Corp.'s RealSense™ camera, which includes IR cameras, a color camera, an IR laser, and an inertial measurement unit (IMU) and/or other sensors may be used to obtain a digital data set comprising tissue information, where each wavelength of light may generate different observed descriptors (e.g., visible light, infrared, laser scans, etc.). Using the operations for multi-modal sensitive recognition described above, modal descriptors for each wavelength may be bound or registered to a physical location on the body of a patient, which may form a digital data set (tuple), which can change with time and be monitored, e.g., for diagnoses, prognoses, etc.

In an embodiment, modal descriptors generated using one or more of the methods described above may be registered to one or more physical features. For example, each camera of camera sensor 220 may have a unique field of view and/or point of view that allows for registration to a same or different physical feature. Further, modal descriptors may be absolutely registered to a physical feature (e.g., to a mole), or relatively registered to a physical feature (e.g., registered based on a distance from a physical feature).

In an embodiment, a descriptor object may exist in a multiple dimension space. For example, "eigen-descriptors" may be created for each type of tissue or disease. Thus, a descriptor object may be rotated to generate a projection that is a descriptor for a unique point of view (e.g., a projection point of view, rather than a physical point of view).

In an embodiment, modal descriptors as described herein also may be used for facial recognition. For example, otherwise similar facial features among twins may be distinguishable in infrared images, e.g., modal descriptors may track how blood movement during heart-beats captures in an IR video scan (e.g., at 60 fps) changes descriptors.

In an embodiment, modal descriptors may be time invariant or periodic in time such that descriptors from one time period to another will be similar, e.g., modal descriptors registered to breathing or heart-beats. For example, light interference between wavelengths (e.g., bright visible light) may interfere with or overload an IR sensor. Alternatively, modal descriptors may be tracked as a function of time such that machine learning algorithms may be used to identify and predict changes (e.g., for diagnostics or detection) in the descriptors at a selected reference location.

In an embodiment, an empirical model may be built for a portion of a patient using modal descriptors. For example, the empirical model may be configured to measure elasticity of skin by tracking reference locations (i.e., registration points) on the skin. For example, the modal descriptors may track elasticity when the patient rotates their arm at various points in time (e.g., to track the progress of a rehabilitation). In addition, different views of the body portion may be registered using reference locations, e.g., top, bottom, left, right, etc.

In an embodiment, modal descriptors may be used to filter a known state of tissue. For example, modal descriptors may be generated to be invariant with respect to tanned skin, e.g., based on a control sample. Further, because there are multiple skin colors and tones, including darker skin tones which absorb heat and can be unsuitable for IR imaging, a calibration system may be created to measure each type of skin tone and, for example, swap modalities, e.g., texture for RGB, as required. In addition, the calibration could vary a wavelength of light and capture multiple images, e.g., one at each wavelength, compensate for hair on the body, etc.

In an embodiment, modal descriptors as described herein may be applied to a vehicle as shown in FIG. 1B (e.g., to monitor changes to vehicle components such as combustion engine parts, batteries or generators to monitor and/or detect wear or structural degradation). For example, one or more modal descriptors related to a light energy modality, e.g., sweeping from RGB to infrared, may be used to inspect the structural integrity of a motorbike. Likewise, modal descriptors as described herein may be applied to a building (e.g., during construction) as shown in FIG. 1C. For example, one or more modal descriptors related to a light energy modality may be used to inspect building cladding such as concrete or brick to determine wear rates and estimates for safety-related replacement schedules.

In an embodiment, modal descriptors as described herein may be applied in a welding use case. For example, one or more modal descriptors related to a light energy modality (e.g., sweeping the spectrum from ultraviolet to infrared) or a sound energy modality (e.g., across a decibel range) may be used to inspect welds to monitor and/or detect yield and/or tensile strength.

Other use cases for the modal descriptors as described herein may include using one or more modal descriptors related to one or more modalities to monitor changes to terrain (e.g., across seasons or during storms) or grow plants, e.g., a hydroponics use case. For example, one or more modal descriptors related to one or more modalities (e.g., in a greenhouse, grow box, grow tent, garden, part of a field, etc.) may be used to monitor plant development and/or recovery from disease, detect insect damage (e.g., leaf or root damage, etc.), and monitor and/or detect responses to pesticides.

Figure 6:
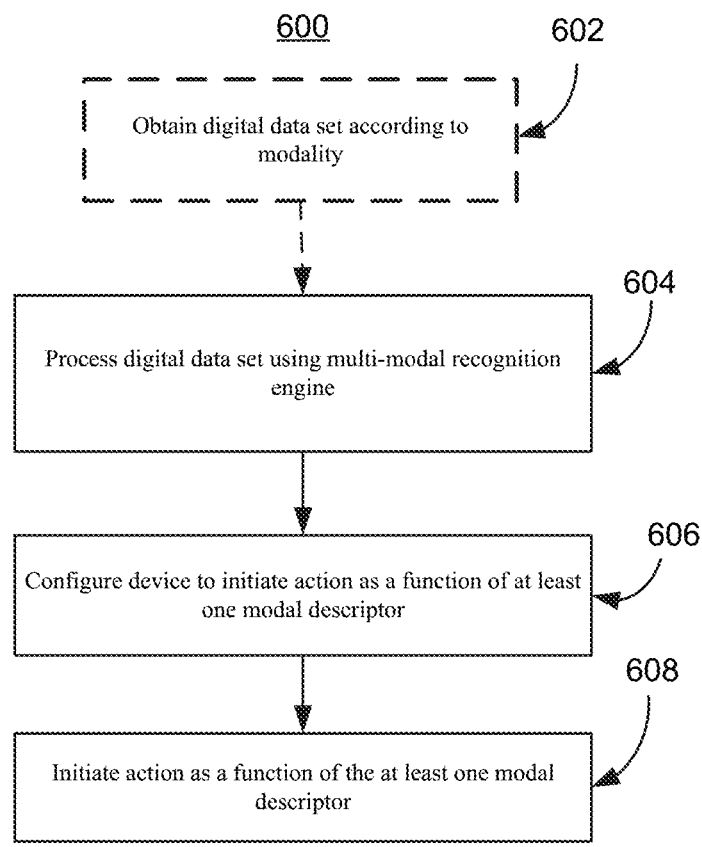
FIG. 6 illustrates a flow diagram of example operations for multi-modal sensitive recognition in accordance with an embodiment.

FIG. 6 illustrates a flow diagram of example operations for multi-modal sensitive recognition in accordance with an embodiment. For example, the computer-based multi-modal sensitive recognition system may comprise a mobile device, e.g., device 210, that implements one or more of the processing and/or storage steps in flow diagram 600. In an embodiment, the mobile device may include at least one of a cell phone, a scanner, a camera assembly, a medical device, a drone, a vehicle, a robot, a virtual reality (VR) or augmented reality (AR) headset, a laptop, a netbook, a tablet PC, an ultra-mobile PC (UMPC), a Mobile Internet Device (MID), a smartphone, a PDA, an e-reader, a game console, or other mobile device.

At step 602, device 210 obtains a digital data set according to a modality. For example, the digital data set may include multiple digital representations of an object at different values of a dimension of relevance of a modality.

At step 604, device 210 processes the digital data set using multi-modal recognition engine 230, e.g., as described in FIGS. 4-6 above. At multi-modal recognition engine 230, at least one modal descriptor may be derived by deriving, according to an implementation of a feature detection algorithm, a set of feature descriptors for at least one reference location and at the different values of the corresponding dimension of relevance, calculating a set of differences between the feature descriptors in the set of feature descriptors, and aggregating the set of differences into the at least one modal descriptor representing differences across the different values of the dimension of relevance. In an embodiment, device 210 or multi-modal recognition engine 230 may automatically select the at least one reference location. Alternatively, a user may manually select the at least one reference location.

At step 606, device 210 is configured by multi-modal recognition engine 230 to initiate an action as a function of the at least one modal descriptor, and at step 608, device 210 initiates the action as a function of the at least one modal descriptor. For example, the action may include at least one of a database look-up using the modal descriptor as an index, logging an event in a database record based on the model descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, capturing a digital representation of a scene, or another action.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers.

A high-level block diagram of an exemplary client-server relationship that may be used to implement systems, apparatus and methods described herein is illustrated in FIG. 7. Client-server relationship 700 comprises client 710 in communication with server 720 via network 730 and illustrates one possible division of multi-modal sensitive recognition between client 710 and server 720. For example, client 710, in accordance with the various embodiments described above, may obtain a digital data set according to a modality, select at least one reference location associated with the object, derive, according to an implementation of a feature detection algorithm, a set of feature descriptors for the at least one reference location and at the different values of the corresponding dimension of relevance, calculate a set of differences between the feature descriptors in the set of feature descriptors, aggregate the set of differences into the at least one modal descriptor representing differences across the different values of the dimension of relevance, and configure a device to initiate an action as a function of the at least one modal descriptor, where the action may include at least one of a database look-up using the modal descriptor as an index, logging an event in a database record based on the model descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, capturing a digital representation of a scene, or another action. Client 710 further send the digital data set and the at least one modal descriptor to server 720. Server 720 may, in turn, receive the digital data set and the at least one modal descriptor from client 710, search recognition databases or other databases and execute machine learning algorithms to improve, for example, recognition algorithms, modal descriptor algorithms, predictions of results, selections of actions, etc., generate and send instructions to remotely control one or more operations of device 210 and/or camera sensor 220, and store data relating to digital data set 202 and/or the at least one modal descriptor 206, e.g., in at least one of server main memory device 244 and persistent storage device 250. Client 710 may further receive instructions from server 720 that control one or more operations of client 710, or improve, for example, recognition algorithms, modal descriptor algorithms, predictions of results, selections of actions, etc. In some instances, a modal descriptor may be compressed or reduced in size (e.g., in relation to a sum of the feature descriptors from which it is derived) by further techniques to be a more compact method of describing images relative to large amounts of local descriptors. For example, modal descriptors may be compressed using a Principal Components Analysis (PCA) projection matrix such as described in U.S. Pat. No. 9,722,186 to Bing Song. Notably, the compression of modal descriptors can reduce the memory requirements necessary to practically operate a multi-modal sensitive recognition system (e.g., by both compressing the amount of descriptors used to describe an image dataset, and reducing in size the memory required to store the information contained in feature descriptors) and transmit modal descriptors between device 210 and server 240.

One skilled in the art will appreciate that the exemplary client-server relationship illustrated in FIG. 7 is only one of many client-server relationships that are possible for implementing the systems, apparatus, and methods described herein. As such, the client-server relationship illustrated in FIG. 7 should not, in any way, be construed as limiting.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 4-6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
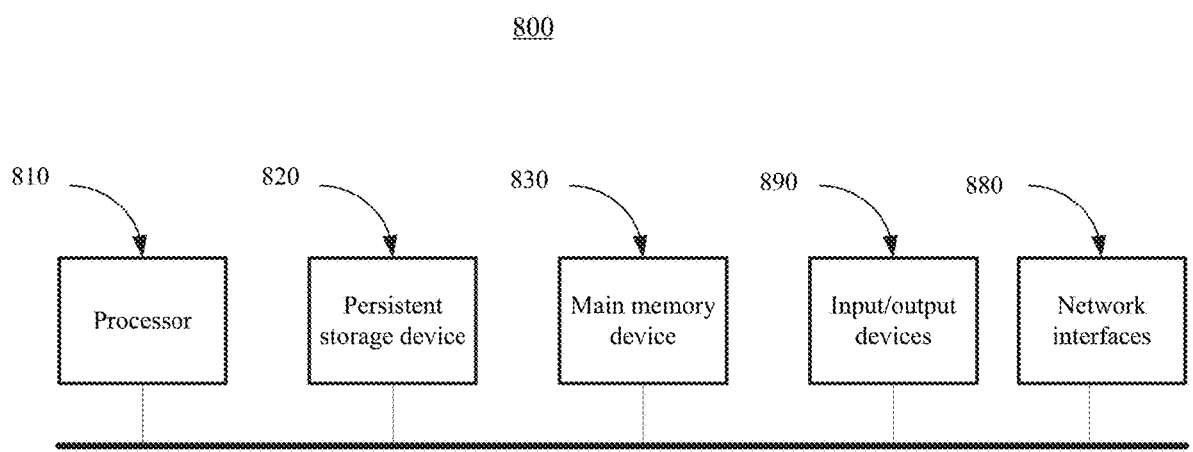
FIG. 8 illustrates a block diagram of a distributed computer system that can be used for implementing one or more aspects of the various embodiments.

A high-level block diagram of an exemplary apparatus that may be used to implement systems, apparatus and methods described herein is illustrated in FIG. 8. Apparatus 800 comprises a processor 810 operatively coupled to a persistent storage device 820 and a main memory device 830. Processor 810 controls the overall operation of apparatus 800 by executing computer program instructions that define such operations. The computer program instructions may be stored in persistent storage device 820, or other computer-readable medium, and loaded into main memory device 830 when execution of the computer program instructions is desired. For example, multi-modal recognition engine 230 may comprise one or more components of computer 800. Thus, the method steps of FIGS. 4-6 can be defined by the computer program instructions stored in main memory device 830 and/or persistent storage device 820 and controlled by processor 810 executing the computer program instructions. For example, the computer program instructions can be implemented as computer executable code programmed by one skilled in the art to perform an algorithm defined by the method steps of FIGS. 4-6. Accordingly, by executing the computer program instructions, the processor 810 executes an algorithm defined by the method steps of FIGS. 4-6. Apparatus 800 also includes one or more network interfaces 880 for communicating with other devices via a network. Apparatus 800 may also include one or more input/output devices 890 that enable user interaction with apparatus 800 (e.g., display, keyboard, mouse, speakers, buttons, etc.).

Processor 810 may include both general and special purpose microprocessors and may be the sole processor or one of multiple processors of apparatus 800. Processor 810 may comprise one or more central processing units (CPUs), and one or more graphics processing units (GPUs), which, for example, may work separately from and/or multi-task with one or more CPUs to accelerate processing, e.g., for parallelizing one or more processes for deriving modal descriptors as described herein. Processor 810, persistent storage device 820, and/or main memory device 830 may include, be supplemented by, or incorporated in, one or more application-specific integrated circuits (ASICs) and/or one or more field programmable gate arrays (FPGAs).

Persistent storage device 820 and main memory device 830 each comprise a tangible non-transitory computer readable storage medium. Persistent storage device 820, and main memory device 830, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 890 may include peripherals, such as a printer, scanner, display screen, etc. For example, input/output devices 890 may include a display device such as a cathode ray tube (CRT), plasma or liquid crystal display (LCD) monitor for displaying information (e.g., a DNA accessibility prediction result) to a user, a keyboard, and a pointing device such as a mouse or a trackball by which the user can provide input to apparatus 800.

Any or all of the systems and apparatuses discussed herein, including multi-modal recognition engine 230 may be performed by, and/or incorporated in, an apparatus such as apparatus 800. Further, apparatus 800 may utilize one or more neural networks or other deep learning techniques to perform multi-modal recognition engine 230 or other systems or apparatuses discussed herein.

One skilled in the art will recognize that an implementation of an actual computer or computer system may have other structures and may contain other components as well, and that FIG. 8 is a high-level representation of some of the components of such a computer for illustrative purposes.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A computer-based multi-modal sensitive recognition system, comprising:
    a non-transitory, computer readable memory storing software instructions of an implementation of a multi-modal recognition algorithm; and
    at least one processor coupled with the memory operating as a multi-modal recognition engine and, upon execution of the multi-modal recognition algorithm, configured as a special-purpose processor to:
        obtain a first digital data set according to a first modality, wherein the first digital data set includes digital representations of an object at different values of a first dimension of relevance of the first modality;
        select at least one reference location associated with the object;
        derive at least one first modal descriptor for the first modality by:
            deriving, according to an implementation of a first feature detection algorithm, a first set of feature descriptors for the at least one reference location and at the different values of the corresponding first dimension of relevance;
            calculating a first set of differences between the feature descriptors in the first set of feature descriptors, wherein the calculation of the first set of differences is based only on values of the feature descriptors in the first set of feature descriptors; and
            aggregating the first set of differences into the at least one first modal descriptor representing differences across the different values of the first dimension of relevance; and
        configure a device to initiate an action as a function of the at least one first modal descriptor.

2. The system of claim 1, wherein the at least one processor is further configured to:
    obtain a second digital data set according to a second modality, wherein the second digital data set includes digital representations of the object at different values of a second dimension of relevance of the second modality;
    derive at least one second modal descriptor for the second modality by:
        deriving, according to an implementation of a second feature detection algorithm, a second set of feature descriptors for the at least one reference location and at the different values of the corresponding second dimension of relevance;
        calculating a second set of differences between the feature descriptors in the second set of feature descriptors; and
        aggregating the second set of differences into the at least one second modal descriptor representing differences across the different values of the second dimension of relevance; and
    configure the device to initiate an action as a function of at least the second modal descriptor.

3. The system of claim 2, wherein the first feature detection algorithm and the second feature detection algorithm are different feature detection algorithms.

4. The system of claim 2, wherein the first modality and the second modality are different modalities.

5. The system of claim 1, wherein the different values of the first dimension of relevance are spaced at regular intervals.

6. The system of claim 1, further comprising a mobile device comprising at least part of the memory and the processor.

7. The system of claim 6, wherein the mobile device includes at least one of the following: a cell phone, a scanner, a camera assembly, a medical device, a drone, a vehicle, a robot, a virtual reality (VR) or augmented reality (AR) headset, a laptop, a netbook, a tablet PC, an ultra-mobile PC (UMPC), a Mobile Internet Device (MID), a smartphone, a PDA, an e-reader, and a game console.

8. The system of claim 1, further comprising at least one sensor capable of acquiring the digital representations according to the first modality.

9. The system of claim 8, wherein the at least one sensor comprises at least one of the following: a visible light camera, an infrared sensor, a UV sensor, a transducer, a LIDAR sensor, a structured-light 3D sensor, a hyperspectral sensor, an acoustic, sound, or vibration sensor, an automotive or transportation sensor, a chemical sensor, an electric current, electric potential, magnetic, or radio sensor, an environment, weather, moisture, or humidity sensor, a flow or fluid velocity sensor, an ionizing radiation or subatomic particle sensor, a navigation instrument, a radar sensor, a radiation sensor, a thermal sensor, an ultrasonic transducer, an accelerometer, a pressure sensor, a touch-based switch, a tilt sensor, a speed sensor, a passive infrared sensor, a proximity or presence sensor, a force, density, or level sensor, a position, angle, displacement, distance, speed, or acceleration sensor, and a heartbeat sensor.

10. The system of claim 1, wherein the dimension of relevance includes at least one of time, wavelength, frequency, depth, scale, luminance, power, intensity, speed, distance, altitude, and flowrate.

11. The system of claim 1, wherein the first modality includes at least one of a sound energy, radiant energy, electromagnetic energy, light energy, particle energy, magnetic energy, vibration energy, thermal energy, mechanical energy, gravitational energy, electrical energy, chemical energy, nuclear or atomic energy, ionization energy, chromodynamic energy, elastic energy, mechanical wave energy and rest energy.

12. The system of claim 1, wherein the at least one reference location comprises at least one of a facial feature, a corner, an edge, a gradient, a texture, a physical feature, a tissue, an organ, a tumor, a lesion, a bone, an appendage, a surface feature, a pattern, a logo, a label, a marker, an index location, a symbol, and an orientation.

13. The system of claim 1, wherein the feature detection algorithm includes an implementation of at least one of a SIFT, SURF, DAISY, TILT, GLOH, HOG, Canny, Sobel, Kayyali, Harris, Plessey, Shi-Tomasi, SUSAN, level curve curvature, FAST, Laplacian of Gaussian (LoG), Difference of Gaussians (DoG), Determinant of Hessian (DoH), maximally stable extremal regions (MSER), PCBR, grey-level blob, edge detection, blob detection, corner detection, ridge detection, Hough transform, affine invariant feature detection, affine shape adaptation, Harris affine, and Hessian affine algorithm.

14. The system of claim 1, wherein the first set of differences include one or more of an absolute value of the differences, a Euclidian distance, a Hamming distance, a polarity, a deviation, a dissimilarity, a contrast, a distinction, a differentiation, a variance, a variation, a divergence, a disparity, a gap, an imbalance, an absolute value, and a contradiction.

15. The system of claim 1, wherein the at least one first modal descriptor has at least as many dimensions as a feature descriptor derived from the feature detection algorithm.

16. The system of claim 15, wherein the at least one first modal descriptor has more dimensions than a feature descriptor derived from the feature detection algorithm.

17. The system of claim 15, wherein the at least one first modal descriptor is a sum across the first set of differences.

18. The system of claim 1, wherein the at least one first modal descriptor is normalized.

19. The system of claim 1, wherein the device includes at least one of a tablet, a smartphone, a medical device, a server, an appliance, a game console, a vehicle, an input device, an output device, a storage device, a display unit, a camera, a robot, a headset, a steering wheel, a joystick, a microphone, a headphone, a speaker, a touch screen, and a projector.

20. The system of claim 1, wherein the action includes at least one of a database look-up using the at least one first modal descriptor as an index, logging an event in a database record based on the modal descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, and capturing a digital representation of a scene.

21. A method for multi-modal sensitive recognition, the method being performed by at least one processor and memory and comprising:
   obtaining a first digital data set according to a first modality, wherein the first digital data set includes digital representations of an object at different values of a first dimension of relevance of the first modality;
   selecting at least one reference location associated with the object;
   deriving at least one first modal descriptor for the first modality by:
      deriving, according to an implementation of a first feature detection algorithm, a first set of feature descriptors for the at least one reference location and at the different values of the corresponding first dimension of relevance;
      calculating a first set of differences between the feature descriptors in the first set of feature descriptors, wherein the calculation of the first set of differences is based only on values of the feature descriptors in the first set of feature descriptors; and
      aggregating the first set of differences into the at least one first modal descriptor representing differences across the different values of the first dimension of relevance; and
   configuring a device to initiate an action as a function of the at least one first modal descriptor.

22. The method of claim 21, further comprising:
   obtaining a second digital data set according to a second modality, wherein the second digital data set includes digital representations of the object at different values of a second dimension of relevance of the second modality;

deriving at least one second modal descriptor for the second modality by:
  deriving, according to an implementation of a second feature detection algorithm, a second set of feature descriptors for the at least one reference location and at the different values of the corresponding second dimension of relevance;
  calculating a second set of differences between the feature descriptors in the second set of feature descriptors; and
  aggregating the second set of differences into the at least one second modal descriptor representing differences across the different values of the second dimension of relevance; and configuring the device to initiate an action as a function of at least the second modal descriptor.

23. The method of claim 22, wherein the first feature detection algorithm and the second feature detection algorithm are different feature detection algorithms.

24. The method of claim 22, wherein the first modality and the second modality are different modalities.

25. The method of claim 21, wherein the different values of the first dimension of relevance are spaced at regular intervals.

26. The method of claim 21, further comprising acquiring the digital representations according to the first modality.

27. The method of claim 21, wherein the dimension of relevance includes at least one of time, wavelength, frequency, depth, scale, luminance, power, intensity, speed, distance, altitude, and flowrate.

28. The method of claim 21, wherein the first modality includes at least one of a sound energy, radiant energy, electromagnetic energy, light energy, particle energy, magnetic energy, vibration energy, thermal energy, mechanical energy, gravitational energy, electrical energy, chemical energy, nuclear or atomic energy, ionization energy, chromodynamic energy, elastic energy, mechanical wave energy and rest energy.

29. The method of claim 21, wherein the at least one reference location comprises at least one of a facial feature, a corner, an edge, a gradient, a texture, a physical feature, a tissue, an organ, a tumor, a lesion, a bone, an appendage, a surface feature, a pattern, a logo, a label, a marker, an index location, a symbol, and an orientation.

30. The method of claim 21, wherein the feature detection algorithm includes an implementation of at least one of a SIFT, SURF, DAISY, TILT, GLOH, HOG, Canny, Sobel, Kayyali, Harris, Plessey, Shi-Tomasi, SUSAN, level curve curvature, FAST, Laplacian of Gaussian (LoG), Difference of Gaussians (DoG), Determinant of Hessian (DoH), maximally stable extremal regions (MSER), PCBR, grey-level blob, edge detection, blob detection, corner detection, ridge detection, Hough transform, affine invariant feature detection, affine shape adaptation, Harris affine, and Hessian affine algorithm.

31. The method of claim 21, wherein the first set of differences include one or more of an absolute value of the differences, a Euclidian distance, a Hamming distance, a polarity, a deviation, a dissimilarity, a contrast, a distinction, a differentiation, a variance, a variation, a divergence, a disparity, a gap, an imbalance, an absolute value, and a contradiction.

32. The method of claim 21, wherein the at least one first modal descriptor has at least as many dimensions as a feature descriptor derived from the feature detection algorithm.

33. The method of claim 32, wherein the at least one first modal descriptor has more dimensions than a feature descriptor derived from the feature detection algorithm.

34. The method of claim 21, wherein the at least one first modal descriptor is normalized.

35. The method of claim 32, wherein the at least one first modal descriptor is a sum across the first set of differences.

36. The method of claim 21, wherein the device includes at least one of a tablet, a smartphone, a medical device, a server, an appliance, a game console, a vehicle, an input device, an output device, a storage device, a display unit, a camera, a robot, a headset, a steering wheel, a joystick, a microphone, a headphone, a speaker, a touch screen, and a projector.

37. The method of claim 21, wherein the action includes at least one of a database look-up using the at least one first modal descriptor as an index, logging an event in a database record based on the modal descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, and capturing a digital representation of a scene.

38. A non-transitory, computer readable medium storing instructions executable by at least one processor for multimodal sensitive recognition, which, when executed by the at least one processor, cause the at least one processor to perform one or more steps comprising:
  obtaining a first digital data set according to a first modality, wherein the first digital data set includes digital representations of an object at different values of a first dimension of relevance of the first modality;
  selecting at least one reference location associated with the object;
  deriving at least one first modal descriptor for the first modality by:
    deriving, according to an implementation of a first feature detection algorithm, a first set of feature descriptors for the at least one reference location and at the different values of the corresponding first dimension of relevance;
    calculating a first set of differences between the feature descriptors in the first set of feature descriptors, wherein the calculation of the first set of differences is based only on values of the feature descriptors in the first set of feature descriptors; and
    aggregating the first set of differences into the at least one first modal descriptor representing differences across the different values of the first dimension of relevance; and
  configuring a device to initiate an action as a function of the at least one first modal descriptor.

39. The computer readable medium of claim 38, further comprising:
  obtaining a second digital data set according to a second modality, wherein the second digital data set includes digital representations of the object at different values of a second dimension of relevance of the second modality;
  deriving at least one second modal descriptor for the second modality by:

deriving, according to an implementation of a second feature detection algorithm, a second set of feature descriptors for the at least one reference location and at the different values of the corresponding second dimension of relevance;

calculating a second set of differences between the feature descriptors in the second set of feature descriptors; and aggregating the second set of differences into the at least one second modal descriptor representing differences across the different values of the second dimension of relevance; and configuring the device to initiate an action as a function of at least the second modal descriptor.

40. The computer readable medium of claim 39, wherein the first feature detection algorithm and the second feature detection algorithm are different feature detection algorithms.

41. The computer readable medium of claim 39, wherein the first modality and the second modality are different modalities.

42. The computer readable medium of claim 38, wherein the different values of the first dimension of relevance are spaced at regular intervals.

43. The computer readable medium of claim 38, further comprising acquiring the digital representations according to the first modality.

44. The computer readable medium of claim 38, wherein the dimension of relevance includes at least one of time, wavelength, frequency, depth, scale, luminance, power, intensity, speed, distance, altitude, and flowrate.

45. The computer readable medium of claim 38, wherein the first modality includes at least one of a sound energy, radiant energy, electromagnetic energy, light energy, particle energy, magnetic energy, vibration energy, thermal energy, mechanical energy, gravitational energy, electrical energy, chemical energy, nuclear or atomic energy, ionization energy, chromodynamic energy, elastic energy, mechanical wave energy and rest energy.

46. The computer readable medium of claim 38, wherein the at least one reference location comprises at least one of a facial feature, a corner, an edge, a gradient, a texture, a physical feature, a tissue, an organ, a tumor, a lesion, a bone, an appendage, a surface feature, a pattern, a logo, a label, a marker, an index location, a symbol, and an orientation.

47. The computer readable medium of claim 38, wherein the feature detection algorithm includes an implementation of at least one of a SIFT, SURF, DAISY, TILT, GLOH, HOG, Canny, Sobel, Kayyali, Harris, Plessey, Shi-Tomasi, SUSAN, level curve curvature, FAST, Laplacian of Gaussian (LoG), Difference of Gaussians (DoG), Determinant of Hessian (DoH), maximally stable extremal regions (MSER), PCBR, grey-level blob, edge detection, blob detection, corner detection, ridge detection, Hough transform, affine invariant feature detection, affine shape adaptation, Harris affine, and Hessian affine algorithm.

48. The computer readable medium of claim 38, wherein the first set of differences include one or more of an absolute value of the differences, a Euclidian distance, a Hamming distance, a polarity, a deviation, a dissimilarity, a contrast, a distinction, a differentiation, a variance, a variation, a divergence, a disparity, a gap, an imbalance, an absolute value, and a contradiction.

49. The computer readable medium of claim 38, wherein the at least one first modal descriptor has at least as many dimensions as a feature descriptor derived from the feature detection algorithm.

50. The computer readable medium of claim 49, wherein the at least one first modal descriptor has more dimensions than a feature descriptor derived from the feature detection algorithm.

51. The computer readable medium of claim 49, wherein the at least one first modal descriptor is a sum across the first set of differences.

52. The computer readable medium of claim 38, wherein the at least one first modal descriptor is normalized.

53. The computer readable medium of claim 38, wherein the device includes at least one of a tablet, a smartphone, a medical device, a server, an appliance, a game console, a vehicle, an input device, an output device, a storage device, a display unit, a camera, a robot, a headset, a steering wheel, a joystick, a microphone, a headphone, a speaker, a touch screen, and a projector.

54. The computer readable medium of claim 38, wherein the action includes at least one of a database look-up using the at least one first modal descriptor as an index, logging an event in a database record based on the modal descriptor, generating a diagnosis, generating a treatment, generating a prognosis, identifying a clinical trial, initiating a transaction, initiating a payment, triggering an alert, rendering a visual display, steering a vehicle, directing a robotic arm, generating a message, generating a display, and capturing a digital representation of a scene.

* * * * *